H. D. JAMES.
RELAY.
APPLICATION FILED JUNE 9, 1914.
1,235,033.
Patented July 31, 1917.
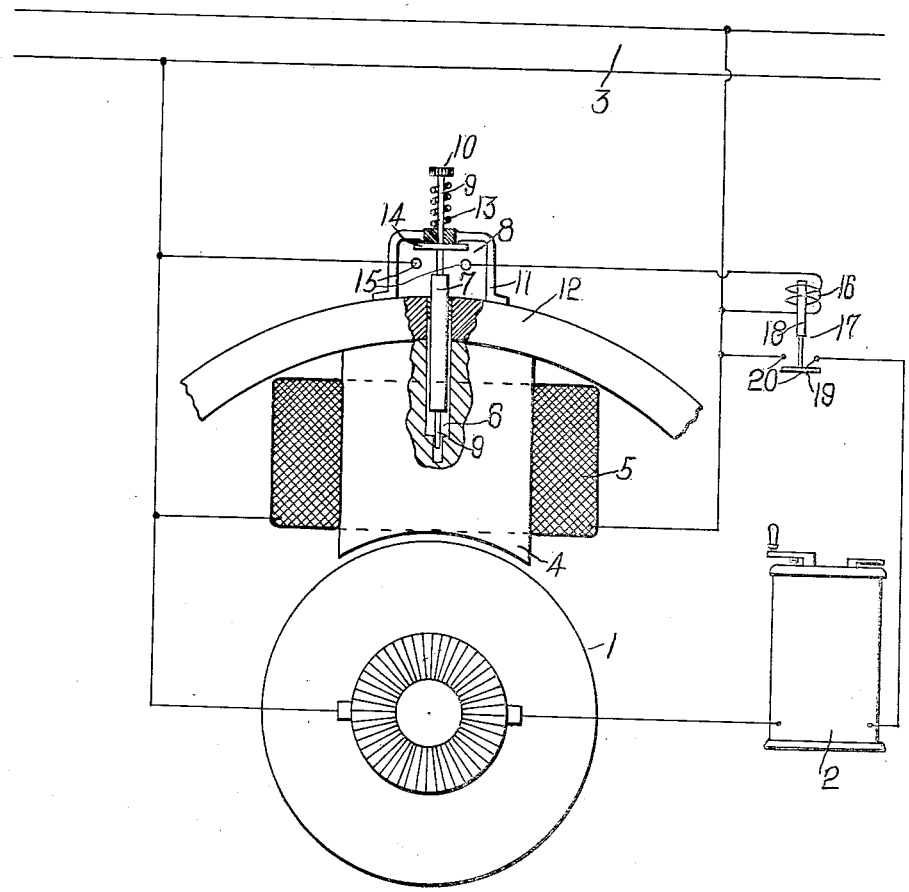

UNITED STATES PATENT OFFICE.

HENRY D. JAMES, OF WILKINSBURG, PENNSYLVANIA, ASSIGNOR TO WESTINGHOUSE ELECTRIC AND MANUFACTURING COMPANY, A CORPORATION OF PENNSYLVANIA.

RELAY.

1,235,033.   Specification of Letters Patent.   Patented July 31, 1917.

Application filed June 9, 1914. Serial No. 843,944.

*To all whom it may concern:*

Be it known that I, HENRY D. JAMES, a citizen of the United States, and a resident of Wilkinsburg, in the county of Allegheny and State of Pennsylvania, have invented a new and useful Improvement in Relays, of which the following is a specification.

My invention relates to relays and particularly to field magnet relays employed to protect dynamo-electric machines.

One object of my invention is to provide a relay, of the above indicated character, which will interrupt the current traversing the armature winding of a motor when the magnetic flux in the field magnet pole pieces of the same decreases to an abnormally low value.

Another object of my invention is to prevent the interruption of the current traversing the armature winding of a motor when the current in the field winding fluctuates momentarily.

In the prior art, relays have been connected in circuit with the shunt field windings of motors to interrupt the currents traversing the armature windings of the same when the currents traversing the shunt field windings fall to such values that the armatures attain excessive speeds. However, the currents traversing the armature windings may be interrupted in case the relays, which are so connected, become deenergized by reason of momentary fluctuations of the currents in the shunt field windings because of changes in armature reaction. The disturbance set up by a change in the armature reaction of a motor is usually only momentary in duration but it is frequently of such value that the flux induced in the magnet pole pieces thereby may induce an electromotive force in the field magnet windings which will oppose the applied electromotive force. If the induced electromotive force is of sufficiently high value, it may decrease the current in the shunt field windings to a very low value or even reverse the same.

According to my invention I provide a device which will not be affected by changes in the armature reaction and which will interrupt the current traversing a motor only when the flux in the field magnet pole pieces decreases to an abnormally low value.

The single figure of the accompanying drawings is a fragmentary diagrammatic view of circuits and apparatus embodying my invention.

A motor 1, which is controlled by a controller 2, is connected to an electrical circuit 3, substantially as shown in the drawing. The field magnet pole piece 4 of the motor 1 has a shunt field winding 5 disposed thereon and is provided with an opening 6 in which a movable core member 7 is located. The member 7 is the movable core member of a relay 8 embodying my invention and is mounted upon a rod 9. The upper end of the rod 9 is provided with a head 10 and a guide member 11 for the rod which is attached to the frame 12 of the motor. A spring 13 is disposed around the rod 9 between the head 10 and the member 11, substantially as shown in the drawing. A movable contact member 14 is mounted upon the rod 9 to engage two stationary members 15 which are the terminals of a circuit containing the winding 16 of a switch 17. The movable core member 18 of the switch 17 has a movable contact member 19 which engages two stationary members 20 that are the terminals of a circuit containing the controller 2.

With the controller in its off position and with no voltage upon the circuits, the members of the apparatus assume the positions shown in the drawing. If a normal voltage is impressed upon the circuit 3, current will traverse the winding 5 and a sufficient flux will be induced in the pole piece 4 to move the movable core member 7 downwardly. The downward movement of the movable core member 7 effects the engagement of the movable contact member 14 and the stationary terminal members 15 to complete a circuit through the coil 16 of the switch 17. When the winding 16 of the switch 17 becomes energized, the motor 1 may be started by operating the controller 2. The operation of the controller through its various steps may cause the armature reaction of the motor to vary and momentary magnetic fluxes to be induced in the field magnet pole pieces 4. This momentary flux will not affect the pull upon the member 7, since the resultant flux is not reduced to an abnormally low value. Thus, any momentary variation in the flux in the field magnet pole pieces, effected by the armature reaction, will not cause the contact members 14 and 15 to become disengaged and the switch 17 to be tripped.

If the current traversing the winding 5 is reduced in value, for any reason, to such an extent that the magnetic pull does not overcome the force of the spring 13, the movable contact member 14 will be disengaged from the contact terminals 15, and the winding 16 of the switch 17 will be deënergized. Thus, the current through the armature of the motor 1 and the controller 2 will be interrupted to prevent the armature from attaining an excessive speed. However, armature reaction will not affect the action of the relay 8, as was hereinbefore set forth.

While I have described my invention with respect to a particular form of construction it is not so limited, but is capable of various modifications within the scope of the appended claims.

I claim as my invention:

1. A relay for a dynamo-electric machine, comprising a movable core member disposed within an opening in the base of a field magnet pole piece of said machine, and means operatively connected to said movable core member for interrupting the current in said dynamo-electric machine when the main magnetic flux only in said field magnet pole piece decreases to a predetermined value.

2. In a dynamo-electric machine, the combination with an armature and a field magnet pole piece, of a movable core member operatively disposed within the body portion of the said field magnet pole piece, and means for interrupting the current in said dynamo-electric machine when the said armature attains an excessive speed because of a reduction in the main magnetic flux only.

3. In a dynamo-electric machine, the combination with an armature, and a field magnet pole piece, of means subjected only to the flux within the body portion of the pole piece for interrupting the current traversing the said dynamo-electric machine when the main magnetic flux only in the body portion of the said field magnet pole piece decreases to a predetermined value.

4. In a dynamo-electric machine, the combination with an armature, a field magnet pole piece having an opening in its base portion that extends within its body portion, a movable core member disposed in the opening and adapted to constitute a portion of the pole piece, and means for withdrawing the movable core member when the main magnetic flux in the body portion of the pole piece decreases to a predetermined value.

5. In a dynamo-electric machine, the combination with an armature, a field magnet pole piece having an opening in its base portion that extends within its body portion, a movable core member disposed in the opening and adapted to constitute a portion of the pole piece, and a resilient member for withdrawing the movable core member when the main magnetic flux only decreases to a predetermined value.

6. A relay for a dynamo-electric machine, comprising a movable core member operatively disposed within the body portion of a field magnet pole piece of said machine, stationary and movable contact members operatively connected to said movable core member, and means for disengaging said stationary and movable contact members when the main magnetic flux only in the body portion of the said field magnet pole piece decreases to a predetermined value.

7. A relay for a dynamo-electric machine, comprising a movable core member operatively disposed within the body portion of a field magnet pole piece of said machine, stationary and movable contact members operatively connected to said movable core member, and resilient means for disengaging said stationary and movable contact members when the main magnetic flux only in the body portion of the said field magnet pole piece decreases to a predetermined value.

In testimony whereof, I have hereunto subscribed my name this 28th day of May, 1914.

HENRY D. JAMES.

Witnesses:
H. L. KEITH,
B. B. HINES.